April 16, 1957 C. H. LAMBERT ET AL 2,789,234
AUXILIARY POWER UNIT FOR VEHICLES
Filed June 16, 1956 2 Sheets-Sheet 1

INVENTORS
CLIFFORD H. LAMBERT
EMRYS J. DAVIES
BY
Hudson Boughton
Williams, David & Hoffmann
ATTORNEYS April 16, 1957  C. H. LAMBERT ET AL  2,789,234
AUXILIARY POWER UNIT FOR VEHICLES
Filed June 16, 1956  2 Sheets-Sheet 2
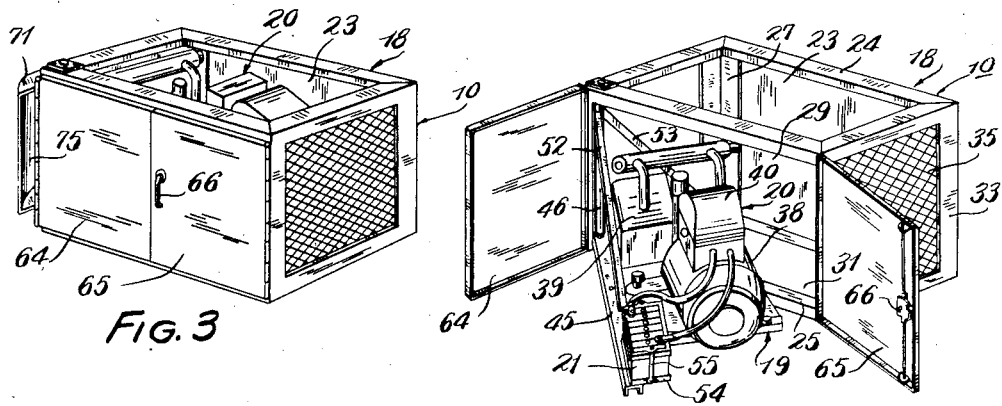
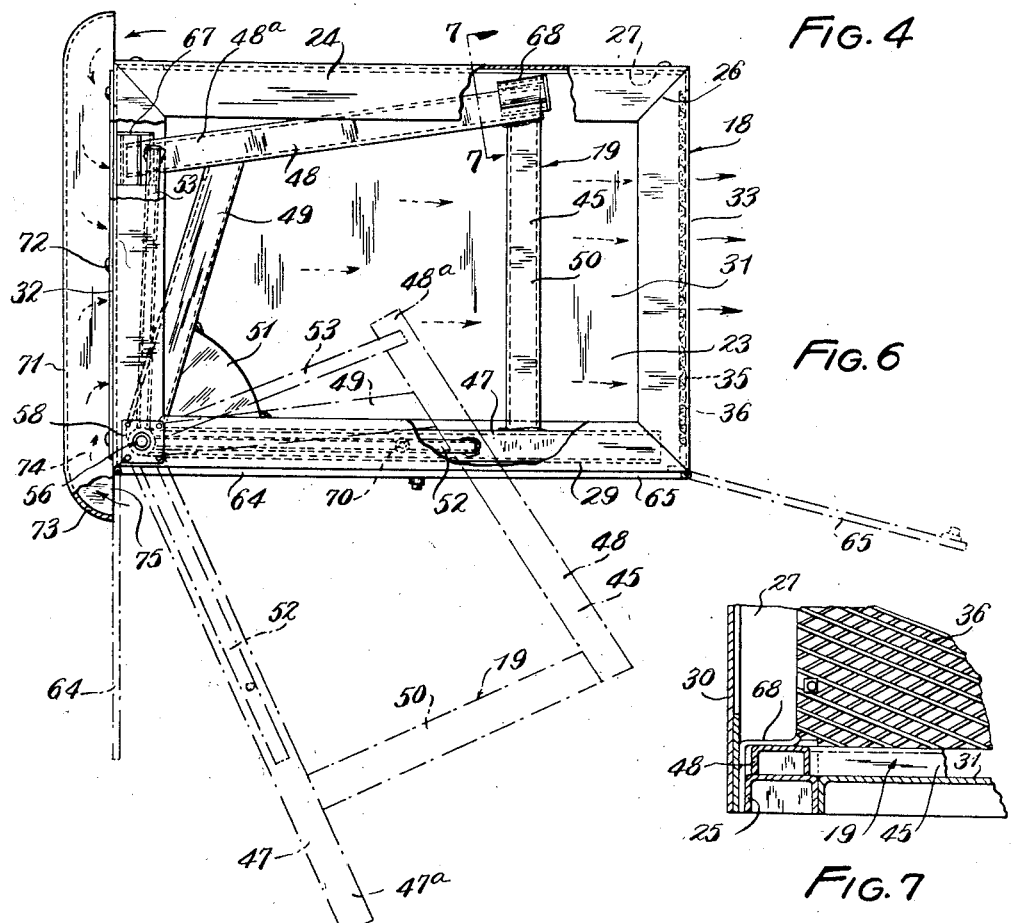
INVENTORS
CLIFFORD H. LAMBERT
EMRYS J. DAVIES
BY
ATTORNEYS

United States Patent Office 2,789,234
Patented Apr. 16, 1957

2,789,234

AUXILIARY POWER UNIT FOR VEHICLES

Clifford H. Lambert, Brecksville, and Emrys J. Davies, Garfield Heights, Ohio, assignors to The Eastern Malleable Iron Company, Cleveland, Ohio, a corporation of Connecticut Application January 16, 1956, Serial No. 559,403

12 Claims. (Cl. 290—1)

This invention relates to auxiliary power units of the kind embodying a generator set and intended for vehicle use and, as one of its objects, aims to provide a novel form of compact and self-contained power unit of this kind which can be completely fabricated in a shop so as to require only the mounting thereof on the vehicle in the desired location, and whose generator set is swingable to an extended position for ease of inspection and servicing.

Another object is to provide such an auxiliary power unit comprising a housing having a laterally outwardly facing access opening in a side thereof, and a carrier supporting an engine-driven generator and pivotally connected with the housing for lateral swinging of the generator set into and out of the housing through the access opening.

A further object is to provide an auxiliary power unit of the character above indicated in which the carrier is swingably mounted on the housing by vertical-axis pivot means disposed with the pivot axis adjacent one of the vertical edges of the access opening.

Still another object is to provide such an auxiliary power unit in which the carrier for the generator set comprises a base adjacent the bottom of the housing and a pivot post secured to and rising above the base and forming a part of the vertical-axis pivot means.

As a further object this invention provides such an auxiliary power unit in which the housing defines an enclosure of a substantially quadrangular plan shape and in which the swingable carrier comprises a substantially quadrangular base having the upright pivot post located adjacent a corner thereof.

Additionally, this invention provides a novel power unit of the character mentioned above in which the housing has air inlet and outlet openings and in which a pan-shaped deflector covering the air inlet opening cooperates with the housing to define a circuitous air-intake passage.

It is also an object of this invention to provide a novel housing unit for use in housing auxiliary power equipment or other apparatus in a manner such that the equipment or apparatus will be readily transportable and also readily accessible for inspection and servicing.

In the accompanying sheets of drawings forming a part of this specification,

Fig. 3 is a perspective view similar to that of Fig. 2 but showing the doors of the housing closed;

Fig. 4 is a perspective view similar to that of Fig. 2 but with the generator set swung to a partially extended position;

Fig. 6 is a top plan view of the unit with the generator set and battery removed from the carrier; and Fig. 7 is a fragmentary vertical section taken on section line 7—7 of Fig. 6.

Figure 1:
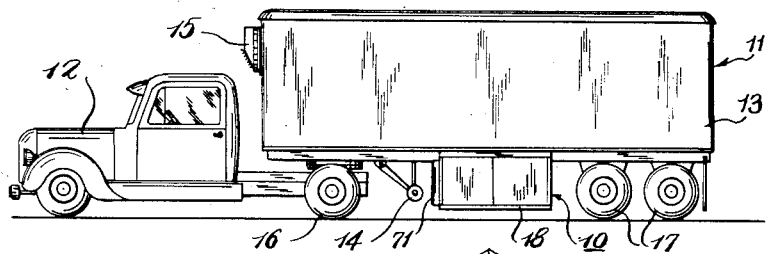
Fig. 1 is a side elevation showing a vehicle having the auxiliary power unit of this invention applied thereto.

The auxiliary power unit 10 of the present invention is intended for use on a motor vehicle, such as the tractor-trailer vehicle 11 of Fig. 1, for supplying power to auxiliary equipment of the vehicle. As here shown, the vehicle 11 comprises a tractor unit 12 and a trailer unit 13 connected with the tractor unit and being in the form of a van adapted to carry various kinds of produce or merchandise. The trailer unit 13 is equipped with a retractable parking support 14 and with a refrigerating unit 15 of the kind comprising a refrigerant compressor driven by an electric motor.

This auxiliary power unit 10 supplies electricity to the driving motor of the refrigerating unit 15 and is shown in Fig. 1 as being mounted on the under side of the trailer unit 13. The auxiliary power unit 10 can be located at any desired point on the vehicle 11 but, as here shown, is preferably suspended beneath the floor of the van-type body of the trailer unit 13 at a point between the rear wheels 16 of the tractor unit 12 and the rear wheels 17 of the trailer unit.

The auxiliary power unit 10 comprises in general a housing 18, and a carrier 19 supporting a generator set 20 and swingably connected with the housing for swinging of the generator set into and out of the latter. The power unit 10 preferably also comprises a storage battery 21 which is mounted on the carrier 19 adjacent the generator set 20.

Figure 2:
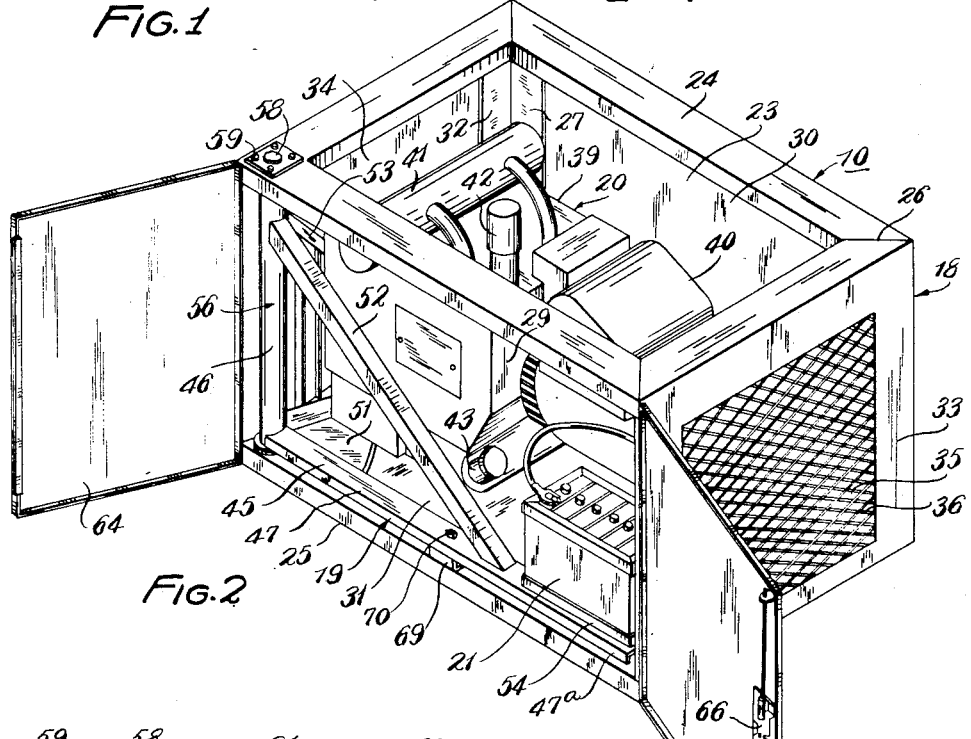
Fig. 2 is a top and front perspective view of the power unit removed from the vehicle and with the generator set in its retracted position in the housing.
Figure 5:
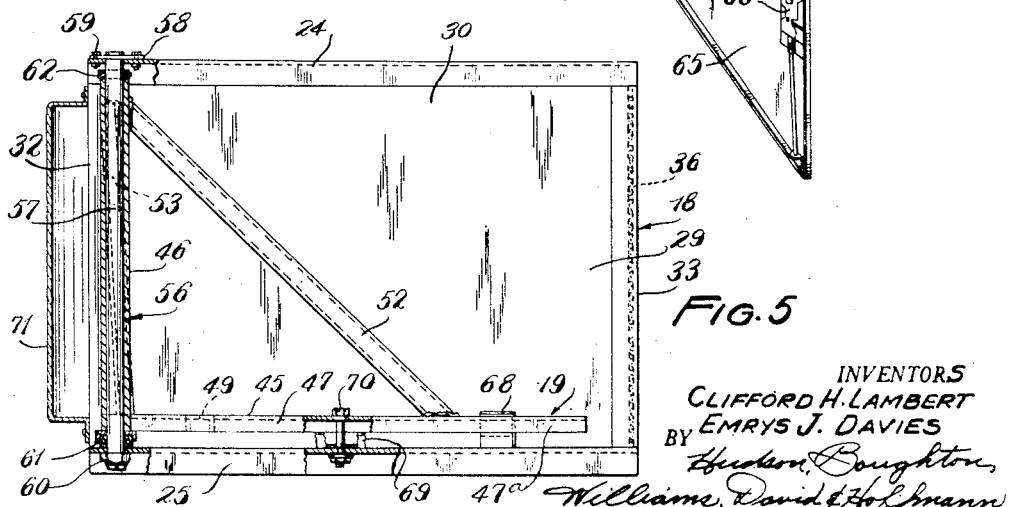
Fig. 5 is mainly a front elevation of the unit with the doors removed from the housing and with the generator set and battery removed from the swingable carrier.

The housing 10 can be of any suitable construction and, as shown in the drawings, is preferably of a quadrangular plan shape defining an enclosure 23 of a similar quadrangular plan shape. The housing 18 can be constructed with top and bottom quadrangular frames 24 and 25 made of channel-shaped structural members whose adjacent ends are welded together in mitered joints 26, as shown in Figs. 2 and 6. The top and bottom frames 24 and 25 are connected in a substantially parallel relation by suitable upright corner members or posts 27 which are here shown as being L-shaped in cross section.

One side of the housing 18, preferably the front thereof, is left open so as to provide a substantially full-height vertical-plane access opening 29 affording access to the enclosure 23. The opposite, or rear side wall, and the bottom of the housing are closed by suitable cover plates 30 and 31 secured to the frame structure. The other two sides 32 and 33 of the housing 18, which in the case of a housing of a rectangular plan shape as here shown can also be referred to as end walls, are provided with air inlet and air outlet openings 34 and 35. The purpose of these air inlet and outlet openings will be explained hereinafter. The outlet opening 35 is covered by a suitable screen or grill 36.

The generator set 20 comprises an electric generator 38 and a power device 39 connected therewith to drive the same, and which power device is here shown as being an internal combustion engine. The generator set 20 may also comprise suitable electric control apparatus associated with the generator 38 and located in a control box 40 mounted on the latter. The internal combustion engine 39 is of a conventional construction having an exhaust muffler 41 thereon and also having a crankcase breather pipe and a crankcase oil filler pipe 43.

The carrier 19 comprises a base 45 of a generally quadrangular plan shape, and an upright hollow pivot post 46 adjacent one of the corners of the base. The base 45 is of a size and shape to lie within the enclosure 23 when the generator set 20 is in its retracted position in the housing 18. The base 45 is here shown as being of an open type of construction formed by two front and rear channel-shaped side members or rails 47 and 48 and two similar end members 49 and 50 extending between the side members and having their ends welded or otherwise suitably connected thereto. The point of connection of the rear end of the end member 49 with the rear side member 48 is located so that one end of this side member forms an end projection 48$^a$ on the left-hand end of the base 45 as shown in Fig. 6, and the point of connection of the front end of the end member 50 with the front side member 47 is located so that one end of this side member forms an end projection 47$^a$ on the right-hand end of the base.

The hollow pivot post 46 of the carrier 19 extends above the base 45 in a substantially perpendicular relation to the plane thereof and is of a height such that it extends vertically for the major portion of the vertical height of the front access opening 29 of the housing. The post 46 is here shown as being located at the left-hand front corner of the base 45 and as being rigid with the base by being welded thereto. The base 45 is preferably reinforced by a gusset plate 51 welded in place therein across the corner where the post 46 is located.

The connection of the post 46 with the base 45 is also formed in part by a pair of downwardly and laterally extending divergent braces 52 and 53. The braces 52 and 53 are preferably formed by metal bars of a channel-shaped or angular cross section. The brace 52 has its lower end welded to the front side member 47 of the base at a point spaced a substantial distance from the post 46, and the brace 53 has its lower end welded to the rear side member 48 at a point located on the end projection 48$^a$ of the latter. The upper ends of the inclined braces 52 and 53 approach a common point and are welded to the post 46 adjacent the upper end thereof.

The generator 38 and the engine 39 of the generator set 20 are suitably mounted on the base 45 of the carrier by being bolted or otherwise secured to such base. The storage battery 21 is preferably mounted on the carrier 19 so as to be located adjacent the front thereof and near the generator 38. The storage battery is here shown as received in a bracket or holder 54 mounted on the portion of the base 45 which is formed by the end projection 47$^a$ and the adjacent portion of the end member 50. The storage battery 21 can be retained in the holder 54 by suitable connecting means which includes the clamping rods 55.

The carrier 19 is swingably connected with the housing 18 by pivot means 56 which includes the hollow post 46 and which is located adjacent one of the vertical side edges of the access opening 29, in this case the left-hand vertical side edge of the access opening. The pivot means 56 is also formed by pivot pin means extending into the hollow post 46, in this instance a pivot shaft 57 extending through this post and having its upper and lower ends suitably anchored on the top and bottom frames 24 and 25 of the housing.

As here shown, the upper end of the pivot shaft 57 has an anchor plate 58 secured thereto and connected to the top frame 24 of the housing by suitable screws 59. The lower end of the pivot shaft 57 is here shown as extending through one of the channel-shaped members of the bottom frame 25 and having a retaining nut 60 threaded thereon.

The carrier 19 is swingably supported by the rotative engagement of the hollow post 46 with the pivot shaft 57 and also by an antifriction thrust bearing 61 disposed around the pivot shaft and located between the bottom frame 25 of the housing and the base 45 of the carrier. Relative axial shifting of the hollow post 46 in an upward direction along the pivot shaft 57 is prevented by a retainer collar 62 which is provided with a setscrew for anchoring the same on the pivot shaft.

From the construction of the carrier 19 and its pivotal connection with the housing 18, as above described, it will be seen that the carrier is swingable laterally and substantially in the horizontal plane of the base 45 thereof, such that the generator set 20 and the storage battery 21 will be movable from their retracted or housed position in the enclosure 23, as shown in Figs. 2 and 3, to an extended position such as that shown in Fig. 4, in which the generator, engine and battery will be readily accessible for inspection and servicing. Thus, by swinging the generator set to such an extended position, access can be readily had to the oil filler pipe 43 of the engine 39 and access can also be readily had to the storage battery 21 for supplying water thereto and for checking the state of charge of the battery. When the desired inspection and servicing of the generator unit 20 and the battery 21 have been accomplished, the carrier 19 is swung back to the retracted position in the housing 18 as shown in Fig. 2.

The access opening 29 can be closed by providing the housing 18 with a pair of swingable doors 64 and 65. These doors are provided with suitable latch mechanism 66, by which they can be releasably held in their closed position shown in Fig. 3.

Jolting of the carrier 19 relative to the housing 18 is prevented by providing suitable clips, in this instance two rear clips 67 and 68 and a front clip 69. The rear clips 67 and 68 are engaged by portions of the base 45 when the carrier has been swung to its fully retracted position, as shown in Fig. 6. These rear clips are suitably secured to the bottom frame 25 of the housing adjacent the rear of the enclosure 23 and are of an L-like shape such that they embrace end portions of the rear side member 48 of the base of the carrier, as shown in Fig. 7.

The front clip 69 is welded on the under side of the front side member 47 of the base 45 and rests on the bottom frame 25 when the carrier is in its retracted position, as shown in Fig. 2. The carrier is maintained in its retracted position as by a retaining bolt 70 extending through the base of the carrier and the bottom frame 25.

It is desirable to have a flow of air through the enclosure 23 for cooling and ventilating the generator unit 20 and the air inlet and outlet openings 34 and 35 accommodate such an air flow. Foreign matter thrown up from the road or pavement by the vehicle wheels or by the wind is prevented from entering the enclosure 23 through the air inlet opening 34 by providing the housing 18 with a deflector 71. The deflector 71 is shown as being a pan-shaped sheet metal member which is mounted on the end wall 32 of the housing 18, as by means of suitable screws 72, and is of a size in relation to this end wall that one or both upright side portions 73 of the deflector project laterally beyond the housing, as shown in Figs. 3 and 6.

Since the deflector 71 is of a pan-like shape, the projecting upright side portions 73 will cooperate with the housing to define circuitous air inlet passages 74, each of which has an air intake opening 75 facing in a direction away from the rear wheels 16 of the tractor unit 12. Because of this location for the openings 75 and the circuitous character of the air inlet passages 74, it will be seen that foreign matter thrown up by the vehicle wheels or by the wind will not be likely to enter the enclosure 23 with the ventilating air being circulated therethrough. The engine 39 and the generator 38 are of the kind which have air circulating devices embodied therein for causing a flow of cooling air in adjacent relation to these components of the generator set.

From the accompanying drawings and the foregoing detailed description it will now be readily understood that this invention provides an auxiliary power unit which can be completely fabricated in a shop or factory and which will require only the mounting thereof on a vehicle to place the same in readiness for supplying power to an auxiliary device of the vehicle, such as a conventional refrigerator unit of a van-type trailer unit. By providing a van-type trailer unit with such an auxiliary power unit the operation of the refrigerating unit will be substantially independent of the tractor unit 12 and can be maintained in operation while the trailer unit is disconnected from the tractor unit or is in a parked condition. It will now also be understood that this novel auxiliary power unit provides for the lateral swinging of the generator set thereof into and out of a housing enclosure to facilitate inspection and servicing of the unit and without causing the necessary liquids contained in the components of the generator set and storage battery from being spilled therefrom. Additionally, it will be seen that the carrier for the generator set, as provided by this invention, has a single rugged pivotal connection with the housing constituting a vertical-axis pivot means located adjacent a vertical side edge of the access opening, such that the generator unit is readily swingable in a substantially horizontal plane to and from its retracted position in the housing.

Although the auxiliary power unit of this invention has been illustrated and described herein to a somewhat detailed extent it will be understood, of course, that the invention is not to be regarded as being limited correspondingly in scope but includes all changes and modifications coming within the terms of the claims hereof.

Having thus described our invention, we claim:

1. An auxiliary power unit for mounting on a vehicle comprising, a housing having an opening in one side thereof, a carrier, a generator set mounted on said carrier and comprising an electric generator and a power device connected therewith to drive the same, and pivot means disposed with its axis extending along an edge of said opening and swingably connecting said carrier with said housing for swinging of said generator set into and out of said housing through said opening.

2. An auxiliary power unit for mounting on a vehicle comprising, a housing having an opening in one side thereof, a carrier, a generator set mounted on said carrier and comprising an electric generator and a power device connected therewith to drive the same, and a substantially vertical-axis pivot means connecting said carrier with said housing for swinging of said generator set into and out of said housing through said opening, said pivot means being located adjacent an upright side edge of said opening and forming the sole support for said carrier and generator set during the swinging thereof.

3. In an auxiliary power unit for mounting on a vehicle, a housing having a substantially vertical-plane access opening in the front thereof, a carrier, a generator set mounted on said carrier and comprising an electric generator and a power device connected therewith to drive the same, said carrier comprising a substantially horizontal base and an upright post means rigid with said base and located substantially at one end of the front portion of the base, and pivot means connecting said post means with said housing to constitute the sole support for said carrier and providing for swinging of said carrier through said front opening to and from a retracted position in said housing.

4. An auxiliary power unit as defined in claim 3 in which said post means is hollow and extends for the major portion of the height of said opening, and in which said pivot means comprises rod means extending coaxially in said post means with the upper and lower ends of said rod means anchored on said housing adjacent the top and bottom thereof.

5. In an auxiliary power unit for mounting on a vehicle, a housing defining an enclosure of a substantially quadrangular plan shape and having a substantially vertical-plane access opening in one side thereof, a substantially quadrangular base, a generator set mounted on said base and comprising an electric generator and a power device connected therewith to drive the same, a post rigid with said base and rising thereabove adjacent a corner thereof, and vertical-axis pivot means connecting said post with said housing and located adjacent one edge of said access opening for a substantially horizontal swinging of said base and generator set into and out of said enclosure through said access opening.

6. In an auxiliary power unit for mounting on a vehicle, a housing defining an enclosure of a substantially quadrangular plan shape and having a substantially vertical-plane access opening in one side thereof, a substantially quadrangular base, a generator set mounted on said base and comprising an electric generator and a power device connected therewith to drive the same, an upright post having its lower end rigid with said base adjacent a corner of the latter, a pair of inclined divergent braces having their upper ends in adjacent relation and connected to said post and their lower ends spaced apart and connected to said base at points spaced from said post, and pivot pin means connecting said post with said housing, said pin means and post defining a vertical-axis single hinge means located adjacent an upright edge of said opening for a substantially horizontal swinging of said base and generator set into and out of said enclosure through said opening.

7. In an auxiliary power unit for mounting beneath the body of a wheeled vehicle, a housing defining an enclosure of a substantially quadrangular plan shape and having a laterally outwardly facing substantially vertical-plane opening in one side thereof affording access to said enclosure, swingable door means for closing said opening, a substantially quadrangular base adjacent the bottom of said enclosure, a generator set mounted on said base and comprising an electric generator and an internal combustion engine connected therewith to drive the same, a storage battery on said base and electrically connected with said generator to be charged thereby, an upright pivot sleeve secured to said base adjacent a corner thereof and extending above said base for the major portion of the height of said opening, a pair of downwardly and laterally diverging braces having their upper ends in adjacent relation and secured to said sleeve adjacent the upper end thereof and their lower ends spaced apart and secured to said base at points spaced from said sleeve, and a pivot shaft extending through said sleeve and connecting the latter with said housing adjacent one of the vertical edges of said opening for lateral swinging of said generator unit and battery into and out of said enclosure through said opening.

8. An auxiliary power unit as defined in claim 7 and having clip means connected with said housing and located in said enclosure at the side of the latter remote from said opening, said clip means having embracing engagement with a portion of said base when said generator set has been swung to a fully retracted position in said enclosure.

9. An auxiliary power unit as defined in claim 7 and which includes an antifriction thrust bearing surrounding said pivot shaft and disposed between said base and the lower portion of said housing.

10. An auxiliary power unit as defined in claim 7 in which said housing has air inlet and outlet openings in different sides thereof, and which includes a substantially pan-shaped deflector mounted on said housing externally thereof and disposed over the air inlet opening, said deflector having at least one edge portion thereof projecting beyond said housing such that said deflector and the adjacent portions of said housing define a circuitous-flow air intake passage.

11. In a housing unit for power apparatus, a housing defining an enclosure and having a laterally outwardly facing substantially vertical-plane opening in one side thereof affording access to said enclosure, a carrier of a size and shape to lie within said enclosure and comprising a laterally extending base adapted to receive power apparatus thereon and an upright post rigid with said base and rising thereabove at a point adjacent one end of the front edge thereof, and pivot means connecting said post with said housing adjacent an upright side edge of said opening for swinging of said carrier through the latter to and from a housed position in said enclosure.

12. In a housing unit for power apparatus, a housing defining an enclosure and having a laterally outwardly facing substantially vertical-plane opening in one side thereof affording access to said enclosure, a carrier of a size and shape to lie within said enclosure and comprising a laterally extending base adapted to receive power apparatus thereon and an upright post rigid with said base and rising thereabove at a point adjacent one end of the front edge thereof, pivot means connecting said post with said housing adjacent an upright side edge of said opening for swinging of said carrier through the latter to and from a housed position in said enclosure; and a pair of downwardly and laterally diverging braces having their upper ends in adjacent relation and secured to said post adjacent the upper end of the latter and their lower ends spaced apart and secured to said base at points spaced from said post.

References Cited in the file of this patent
UNITED STATES PATENTS 2,598,336   Anderson _____ May 27, 1952